(12) United States Patent
Andgart et al.

(10) Patent No.: US 10,182,427 B2
(45) Date of Patent: Jan. 15, 2019

(54) TRANSMITTING AND RECEIVING DOWNLINK GRANT AND DOWNLINK DATA

(71) Applicant: Telefonaktiebolaget L M Ericsson (publ), Stockholm (SE)

(72) Inventors: Niklas Andgart, Södra Sandby (SE); David Astely, Bromma (SE); Henrik Sahlin, Mölnlycke (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

(21) Appl. No.: 14/890,635

(22) PCT Filed: Nov. 6, 2015

(86) PCT No.: PCT/EP2015/075885
§ 371 (c)(1),
(2) Date: Nov. 12, 2015

(87) PCT Pub. No.: WO2017/076459
PCT Pub. Date: May 11, 2017

(65) Prior Publication Data
US 2017/0188340 A1 Jun. 29, 2017

(51) Int. Cl.
*H04W 72/04* (2009.01)
*H04L 5/00* (2006.01)
(Continued)

(52) U.S. Cl.
CPC ......... *H04W 72/042* (2013.01); *H04B 7/155* (2013.01); *H04L 5/0007* (2013.01);
(Continued)

(58) Field of Classification Search
None
See application file for complete search history.

(56) References Cited

U.S. PATENT DOCUMENTS

2010/0135237 A1* 6/2010 Papasakellariou .... H04L 5/0007
370/329
2012/0113936 A1 5/2012 Moulsley et al.
(Continued)

FOREIGN PATENT DOCUMENTS

WO 2010105255 A2 9/2010

OTHER PUBLICATIONS

3rd Generation Partnership Project, "3rd Generation Partnership Project; Technical Specification Group Radio Access Network; Evolved Universal Terrestrial Radio Access (E-UTRA); Multiplexing and channel coding (Release 12)", Technical Specification, 3GPP TS 36.212 V12.6.0, Sep. 1, 2015, pp. 1-95, 3GPP, France.
(Continued)

*Primary Examiner* — Kent K Krueger
(74) *Attorney, Agent, or Firm* — Coats and Bennett, PLLC

(57) ABSTRACT

There is provided mechanisms for transmitting a downlink (DL) grant and DL data to a wireless device. A method is performed by a network node. The method comprises obtaining an indication for providing the DL data to the wireless device. The method comprises transmitting, in a transmission time interval (sTTI) frequency band, the DL grant for the wireless device and the DL data for the wireless device. A position of the DL grant in the sTTI frequency band identifies a position of the DL data in the sTTI frequency band. There is also provided a network node configured to perform such a method. There is further provided mechanisms for receiving a DL grant and DL data from a network node, as performed by a wireless device.

37 Claims, 9 Drawing Sheets

(51) Int. Cl.
    H04L 27/26      (2006.01)
    H04W 72/12      (2009.01)
    H04B 7/155      (2006.01)
    H04W 72/14      (2009.01)

(52) U.S. Cl.
    CPC .......... *H04L 5/0044* (2013.01); *H04L 5/0053*
        (2013.01); *H04L 5/0092* (2013.01); *H04L*
        *5/0094* (2013.01); *H04L 27/2602* (2013.01);
        *H04W 72/1273* (2013.01); *H04W 72/1289*
        (2013.01); *H04W 72/14* (2013.01); *H04W*
                                *72/0406* (2013.01)

(56) References Cited

U.S. PATENT DOCUMENTS

2014/0153539 A1* 6/2014 Seo .................. H04L 5/0053
                                                    370/330
2014/0226607 A1* 8/2014 Holma ................. H04L 1/1812
                                                    370/329
2014/0334397 A1  11/2014 Chen et al.

OTHER PUBLICATIONS

Ericsson, "DCI for short TTI uplink transmissions," R1-160938, 3GPP TSG RAN WG1 Meeting #84, Agenda Item 7.3.4.3, Malta, Feb. 15, 2016, pp. 1-7.

Huawei, et al., "Control signaling enhancements for short TTI," R1-156461, 3GPP TSG RAN WG1 Meeting #83, Agenda Item: 6.2.9.2, Anaheim, USA, Nov. 15, 2015, pp. 1-6.

Etri, "Overview on frame structure and downlink design for TTI shortening," R1-161011, 3GPP TSG RAN WG1 Meeting #84, Agenda Item: 7.3.4.2, Malta, Feb. 15, 2016, pp. 1-7.

Samsung, "Specification impact for DL due to TTI shortening," R1-160585, 3GPP TSG RAN WG1 Meeting #84, Agenda Item: 7.3.4.2, St. Julian's, Malta, Feb. 15, 2016, pp. 1-4.

* cited by examiner

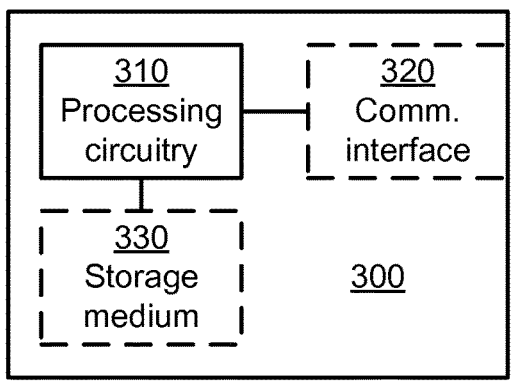
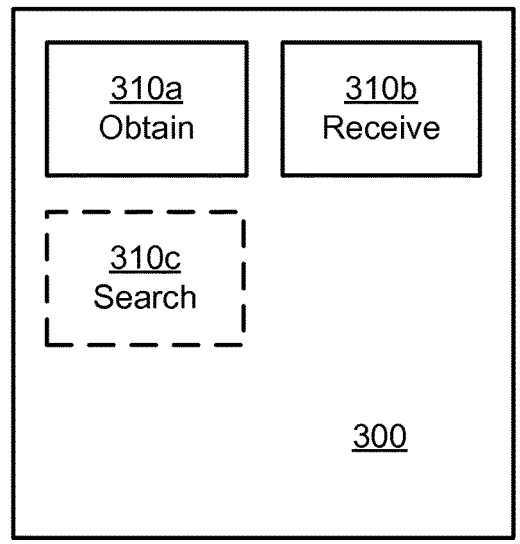
Fig. 3a
Fig. 3b
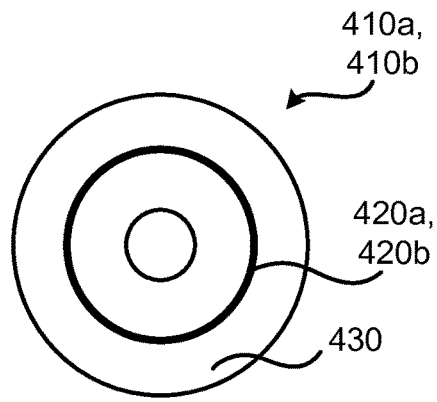
Fig. 4
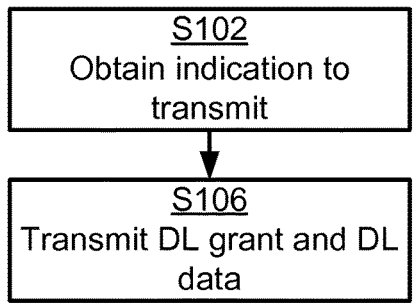
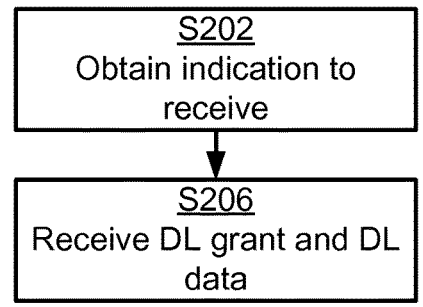
Fig. 5
Fig. 7

TRANSMITTING AND RECEIVING DOWNLINK GRANT AND DOWNLINK DATA

TECHNICAL FIELD

Embodiments presented herein relate to a method, a network node, a computer program, and a computer program product for transmitting a downlink grant and downlink data to a wireless device. Embodiments presented herein further relate to a method, a wireless device, a computer program, and a computer program product for receiving a downlink grant and downlink data from a network node.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is packet data latency. Latency measurements can be performed in all stages of the communications network, for example when verifying a new software release or system component, and/or when deploying the communications network and when the communications network is in commercial operation.

Shorter latency than previous generations of 3GPP radio access technologies was one performance metric that guided the design of Long Term Evolution (LTE). LTE is also now recognized by the end-users to be a system that provides faster access to internet and lower packet latencies than previous generations of mobile radio technologies.

Packet latency is also a parameter that indirectly influences the throughput of the communications network. Traffic using the Hypertext Transfer Protocol (HTTP) and/or the Transmission Control Protocol (TCP) is currently one of the dominating application and transport layer protocol suite used on the Internet. The typical size of HTTP based transactions over the Internet is in the range of a few 10's of Kilo byte up to 1 Mega byte. In this size range, the TCP slow start period is a significant part of the total transport period of the packet stream. During TCP slow start the performance is packet latency limited. Hence, improved packet latency can potentially improve the average throughput, at least for this type of TCP based data transactions.

Radio resource efficiency could also be positively impacted by packet latency reductions. Lower packet data latency could increase the number of transmissions possible within a certain delay bound; hence higher Block Error Rate (BLER) targets could be used for the data transmissions freeing up radio resources potentially improving the capacity of the system.

The existing physical layer downlink control channels, Physical Downlink Control Channel (PDCCH) and enhanced PDCCH (ePDCCH), are used to carry Downlink Control Information (DCI) such as scheduling decisions for uplink (UL; from device to network) and downlink (DL; from network to device) and power control commands. Both PDCCH and ePDCCH are according to present communications networks transmitted once per 1 ms subframe.

3GPP TS 36.212 lists examples of different (DCI) formats for UL and DL resource assignments. UL scheduling grants use either DCI format 0 or DCI format 4. The latter was added in the 3rd Generation Partnership Project (3GPP) Release 10 (Rel-10) for supporting uplink spatial multiplexing The existing way of operation, e.g. frame structure and control signaling, are designed for data allocations in subframes of a fixed length of 1 ms, which may vary only in allocated bandwidth. Specifically, the current DCIs define resource allocations within the entire subframe, and are only transmitted once per subframe. The existing way of operation does not indicate how scheduling of UL and DL data can be performed in short subframes, i.e., subframes shorter than 1 ms.

Hence, there is a need for efficient communications using short subframes.

SUMMARY

An object of embodiments herein is to provide mechanisms for communications using short subframes.

According to a first aspect there is presented a method for transmitting a DL grant and DL data to a wireless device. The method is performed by a network node. The method comprises obtaining an indication for providing the DL data to the wireless device. The method comprises transmitting, in a transmission time interval (sTTI) frequency band, the DL grant for the wireless device and the DL data for the wireless device. A position of the DL grant in the sTTI frequency band identifies a position of the DL data in the sTTI frequency band.

According to a second aspect there is presented a network node for transmitting a DL grant and DL data to a wireless device. The network node comprises processing circuitry. The processing circuitry is configured to cause the network node to obtain an indication for providing the DL data to the wireless device. The processing circuitry is configured to cause the network node to transmit, in an sTTI frequency band, the DL grant for the wireless device (300a) and the DL data for the wireless device. A position of the DL grant in the sTTI frequency band identifies a position of the DL data in the sTTI frequency band.

According to a third aspect there is presented a network node for transmitting a DL grant and DL data to a wireless device. The network node comprises processing circuitry. The network node comprises a computer program product. The computer program product stores instructions that, when executed by the processing circuitry, causes the network node to perform a number of steps, or actions. One step, or action, involves obtaining an indication for providing the DL data to the wireless device. One step, or action, involves transmitting, in an sTTI frequency band, the DL grant for the wireless device and the DL data for the wireless device. A position of the DL grant in the sTTI frequency band identifies a position of the DL data in the sTTI frequency band.

According to a fourth aspect there is presented a network node for transmitting a DL grant and DL data to a wireless device. The network node comprises an obtain module configured to obtain an indication for providing the DL data to the wireless device. The network node comprises a transmit module configured to transmit, in an sTTI frequency band, the DL grant for the wireless device and the DL data for the wireless device. A position of the DL grant in the sTTI frequency band identifies a position of the DL data in the sTTI frequency band.

According to a fifth aspect there is presented a computer program for transmitting a DL grant and DL data to a wireless device, the computer program comprising computer program code which, when run on processing circuitry of a network node, causes the network node to perform a method according to the first aspect.

According to a sixth aspect there is presented a method for receiving a DL grant and DL data from a network node. The method is performed by a wireless device. The method comprises obtaining an indication for receiving the DL data from the network node. The method comprises receiving, in an sTTI frequency band and from the network node, the DL grant for the wireless device and the DL data for the wireless device. A position of the DL grant in the sTTI frequency band identifies a position of the DL data in the sTTI frequency band.

According to a seventh aspect there is presented a wireless device for receiving a DL grant and DL data from a network node. The wireless device comprises processing circuitry. The processing circuitry is configured to cause the wireless device to obtain an indication for receiving the DL data from the network node. The processing circuitry is configured to cause the wireless device to receive, in an sTTI frequency band and from the network node, the DL grant for the wireless device and the DL data for the wireless device. A position of the DL grant in the sTTI frequency band identifies a position of the DL data in the sTTI frequency band.

According to an eighth aspect there is presented a wireless device for receiving a DL grant and DL data from a network node. The wireless device comprises processing circuitry. The wireless device comprises a computer program product. The computer program product stores instructions that, when executed by the processing circuitry, causes the wireless device to perform a number of steps, or actions. One step, or action, comprises obtaining an indication for receiving the DL data from the network node. One step, or action, comprises receiving, in an sTTI frequency band and from the network node, the DL grant for the wireless device and the DL data for the wireless device. A position of the DL grant in the sTTI frequency band identifies a position of the DL data in the sTTI frequency band.

According to a ninth aspect there is presented a wireless device for receiving a DL grant and DL data from a network node. The wireless device comprises an obtain module configured to obtain an indication for receiving the DL data from the network node. The wireless device comprises a receive module configured to receive, in an sTTI frequency band and from the network node, the DL grant for the wireless device and the DL data for the wireless device. A position of the DL grant in the sTTI frequency band identifies a position of the DL data in the sTTI frequency band.

According to a tenth aspect there is presented a computer program for receiving a DL grant and DL data from a network node, the computer program comprising computer program code which, when run on processing circuitry of a wireless device, causes the wireless device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, this network node, this wireless device, and these computer programs provides efficient scheduling of DL data, resulting in efficient communications using short subframes.

Advantageously these methods, this network node, this wireless device, and these computer programs allow for fast scheduling of UL and DL data at sTTI time frames, down to one OFDM symbol TTI length. By using the position of control information as defined by the DL grant in the sTTI frequency band the amount of bits needed in DL control messages can be reduced, thereby reducing overhead in the DL data channel.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 3a is a schematic diagram showing functional units of a wireless device according to an embodiment;

FIG. 3b is a schematic diagram showing functional modules of a wireless device according to an embodiment;

FIG. 4 shows one example of a computer program product comprising computer readable means according to an embodiment;

FIGS. 5, 6, 7, and 8 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
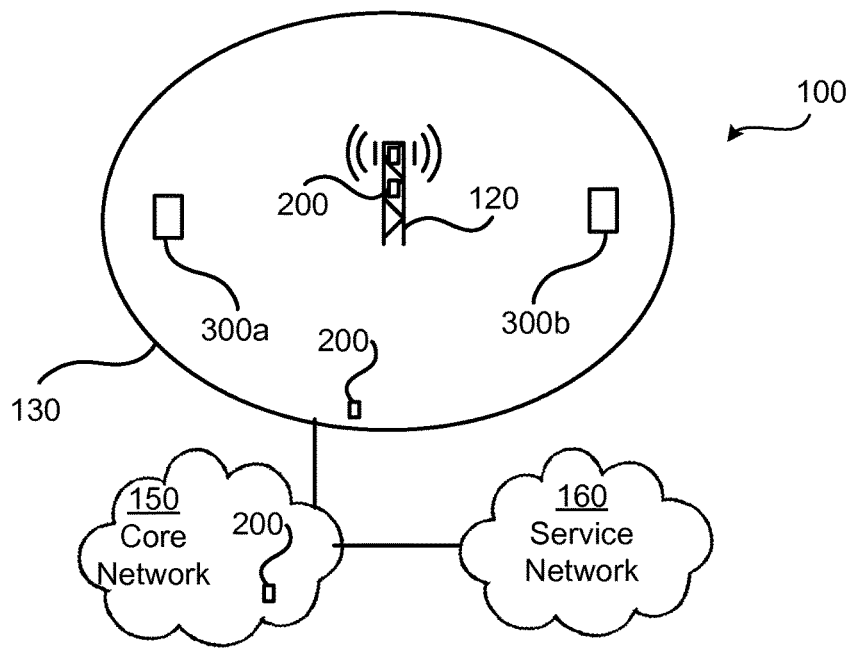
FIG. 1 is a schematic diagram illustrating a communication network according to embodiments.

FIG. 1 is a schematic diagram illustrating a communications network 100 where embodiments presented herein can be applied.

The communications network 100 comprises at least one network node 200. The functionality of the network node 200 and how it interacts with other entities, nodes, and devices in the communications network 100 will be further disclosed below.

The communications network 100 further comprises at least one radio access network node 120. The at least one radio access network node 120 is part of a radio access network 130 and operatively connected to a core network 150 which in turn is operatively connected to a service network 160. The at least one radio access network node 120 provides network access in the radio access network 130. A wireless device 300a, 300b served by the at least one radio access network node 120 is thereby enabled to access services and exchange data with the core network 150 and the service network 160.

Examples of wireless devices 300a, 300b include, but are not limited to, mobile stations, mobile phones, handsets, wireless local loop phones, user equipment (UE), smartphones, laptop computers, and tablet computers. Examples of radio access network nodes 120 include, but are not limited to, radio base stations, base transceiver stations, NodeBs, evolved NodeBs, and access points. As the skilled person understands, the communications network 100 may comprise a plurality of radio access network nodes 120, each providing network access to a plurality of wireless devices 300a, 300b. The herein disclosed embodiments are no limited to any particular number of network nodes 200, radio access network nodes 120 or wireless devices 300a, 300b.

The wireless device 300a, 300b accesses services and exchanges data with the core network 150 and the service network 160 by transmitting data in packets to the core network 150 and the service network 160 and by receiving data in packets from the core network 150 and the service network 160 via the radio access network node 120.

Packet latency has above been identified as degrading network performance. One area to address when it comes to packet latency reductions is the reduction of transport time of data and control signalling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

According to embodiment disclosed herein the TTIs are shortened by introducing shortened subframes (below denoted short subframes). With a short TTI (below denoted sTTI), the subframes can be decided to have any duration in time and comprise resources on a number of OFDM or SC-FDMA symbols within a 1 ms subframe. As one example, the duration of a short subframe may be 0.5 ms, i.e., seven OFDM symbols or SC-FDMA symbols for the case with normal cyclic prefix.

As mentioned, one way to reduce latency is to reduce the transmission time interval (TTI), and instead of assigning resources with a time duration of 1 ms, there is then a need to assign resources with shorter duration such as a number of OFDM symbols or SC-FDMA symbols. This implies a need for device specific control signaling that enables indication of such short scheduling assignments.

Furthermore, since shorter TTIs may incur higher overhead and/or worse demodulation performance there can be dynamical switches between TTI duration, for example between legacy 1 ms TTIs as well as shorter TTIs, in order to optimize the spectral efficiency of the communications network 100.

The embodiments disclosed herein thus relate to mechanisms for transmitting, by a network node 200, a DL grant and DL data to a wireless device 300a. In order to obtain such mechanisms there is provided a network node 200, a method performed by the network node 200, a computer program product comprising code, for example in the form of a computer program, that when run on processing circuitry of the network node 200, causes the network node 200 to perform the method. The embodiments disclosed herein further relate to mechanisms for receiving, by a wireless device 300a, a DL grant and DL data from a network node 200. In order to obtain such mechanisms there is further provided a wireless device 300a, a method performed by the wireless device 300a, and a computer program product comprising code, for example in the form of a computer program, that when run on processing circuitry of the wireless device 300a, causes the wireless device 300a to perform the method.

Figures 2A, 2B:
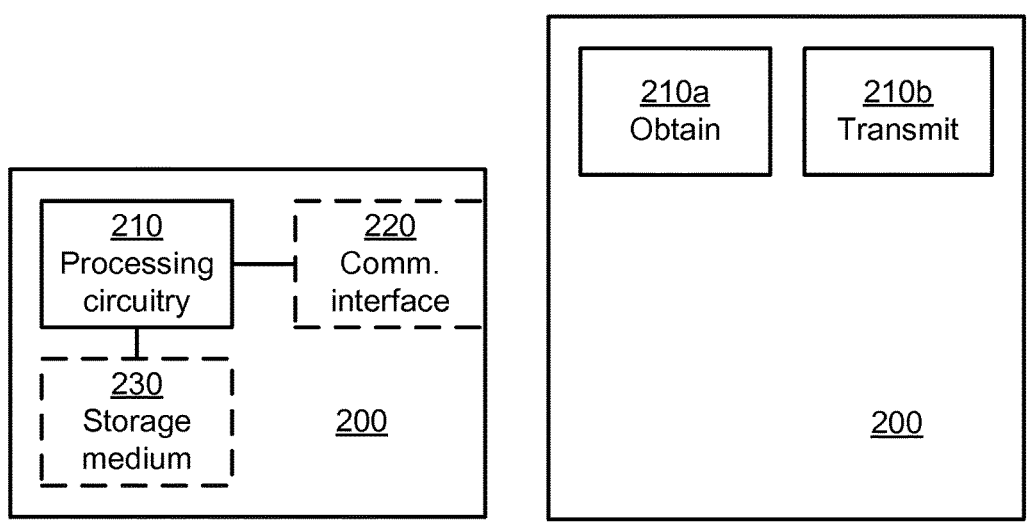
FIG. 2a is a schematic diagram showing functional units of a network node according to an embodiment.
FIG. 2b is a schematic diagram showing functional modules of a network node according to an embodiment.

FIG. 2a schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 4), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S106. These operations, or steps, S102-S106 will be disclosed below. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications at least with at least one wireless device 300a, 300b. As such the communications interface 220 may comprise one or more transmitters and receivers, comprising analogue and digital components and a suitable number of antennas for wireless communications and ports for wireline communications.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

FIG. 2b schematically illustrates, in terms of a number of functional modules, the components of a network node 200 according to an embodiment. The network node 200 of FIG.

2b comprises a number of functional modules; an obtain module 210a configured to perform below steps S102, S102a, and a transmit module 210b configured to perform below steps S104, S106, S106a, S106b. The network node 200 of FIG. 2b may further comprise a number of optional functional modules. The functionality of each functional module 210a-210b will be further disclosed below in the context of which the functional modules 210a-210b may be used. In general terms, each functional module 210a-210b may be implemented in hardware or in software. Preferably, one or more or all functional modules 210a-210b may be implemented by the processing circuitry 210, possibly in cooperation with functional units 220 and/or 230. The processing circuitry 210 may thus be arranged to from the storage medium 230 fetch instructions as provided by a functional module 210a-210b and to execute these instructions, thereby performing any steps as will be disclosed hereinafter.

The network node 200 may be provided as a standalone device or as a part of at least one further device. For example, the network node 200 may be provided in a node of the radio access network 130 or in a node of the core network 150. Alternatively, functionality of the network node 200 may be distributed between at least two devices, or nodes. These at least two nodes, or devices, may either be part of the same network part (such as the radio access network 130 or the core network 150) or may be spread between at least two such network parts. In general terms, instructions that are required to be performed in real time may be performed in a device, or node, operatively closer to the wireless device 300a than instructions that are not required to be performed in real time. In this respect, at least part of the network node 200 may reside in the radio access network 130, such as in the radio access network node 120.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210b of FIG. 2b and the computer program 420a of FIG. 4 (see below).

FIG. 3a schematically illustrates, in terms of a number of functional units, the components of a wireless device 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 4), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300a to perform a set of operations, or steps, S202-S206. These operations, or steps, S202-S206 will be disclosed below. For example, the storage medium 330 may store the set of operations, and the processing circuitry 310 may be configured to retrieve the set of operations from the storage medium 330 to cause the wireless device 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300a may further comprise a communications interface 320 for communications at least with a network node 200. As such the communications interface 320 may comprise one or more transmitters and receivers, comprising analogue and digital components and a suitable number of antennas for wireless communications and ports for wireline communications.

The processing circuitry 310 controls the general operation of the wireless device 300a e.g. by sending data and control signals to the communications interface 320 and the storage medium 330, by receiving data and reports from the communications interface 320, and by retrieving data and instructions from the storage medium 330. Other components, as well as the related functionality, of the wireless device 300a are omitted in order not to obscure the concepts presented herein.

FIG. 3b schematically illustrates, in terms of a number of functional modules, the components of a wireless device 300a according to an embodiment. The wireless device 300a of FIG. 3b comprises a number of functional modules; an obtain module 310a configured to perform below step S202, and a receive module 310b configured to perform below steps S204, S206, S206a. The wireless device 300a of FIG. 3b may further comprises a number of optional functional modules, such as a search module 310c configured to perform below step S206b. The functionality of each functional module 310a-310c will be further disclosed below in the context of which the functional modules 310a-310c may be used. In general terms, each functional module 310a-310c may be implemented in hardware or in software. Preferably, one or more or all functional modules 310a-310c may be implemented by the processing circuitry 310, possibly in cooperation with functional units 320 and/or 330. The processing circuitry 310 may thus be arranged to from the storage medium 330 fetch instructions as provided by a functional module 310a-310c and to execute these instructions, thereby performing any steps as will be disclosed hereinafter.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the network node 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the wireless device 300a as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figure 6:
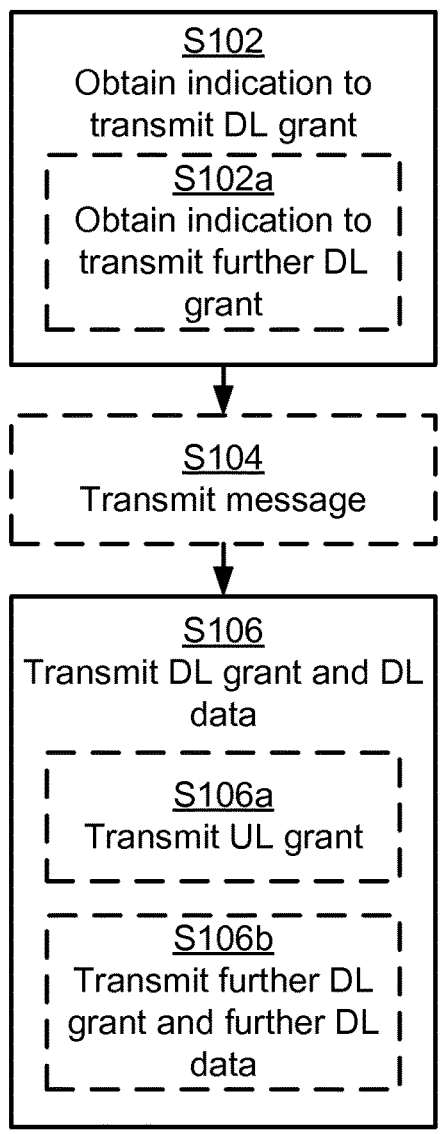
Figure 8:
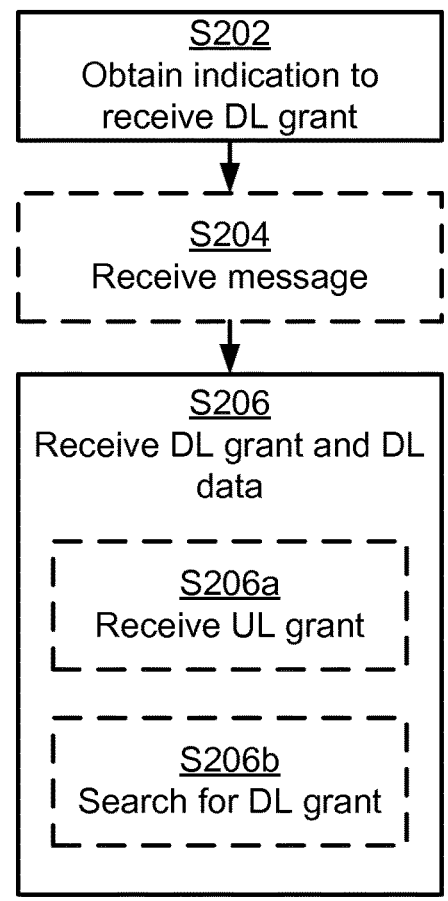

FIGS. 5 and 6 are flow charts illustrating embodiments of methods for transmitting a DL grant and DL data to a wireless device 300a as performed by the network node 200. FIGS. 7 and 8 are flow charts illustrating embodiments of methods for receiving a DL grant and DL data from a network node 200 as performed by the wireless device 300a. The methods are advantageously provided as computer programs 420a, 420b.

Reference is now made to FIG. 5 illustrating a method for transmitting a DL grant and DL data to a wireless device 300a as performed by the network node 200 according to an embodiment.

The network node 200 is configured to, in a step S102, obtain an indication for providing DL data to the wireless device 300a. In this respect the obtain module 210a may comprise instructions that when executed by the network node 200 causes the processing circuitry 210, possibly in conjunction with the communications interface 220 and the storage medium 230, to obtain the indication in order for the network node 200 to perform step S102.

The network node 200 is further configured to, in a step S106, transmit, in an sTTI frequency band, the DL grant for the wireless device 300a and the DL data for the wireless device 300a. In this respect the transmit module 210b may comprise instructions that when executed by the network node 200 causes the processing circuitry 210, possibly in conjunction with the communications interface 220 and the storage medium 230, to transmit the DL grant for the wireless device 300a and the DL data for the wireless device 300a in the sTTI in order for the network node 200 to perform step S106.

A position of the DL grant in the sTTI frequency band identifies a position of the DL data in the sTTI frequency band.

Embodiments relating to further details of transmitting a DL grant and DL data to a wireless device 300a as performed by the network node 200 will now be disclosed.

The term sTTI is above used to denote a short TTI, i.e., a TTI of a short subframe. The short subframe can have a shorter duration in time than 1 ms Hence, the TTI frequency band in which the DL grant for the wireless device 300a and the DL data for the wireless device 300a is transmitted in step S106 can be a short TTI frequency band. The sTTI can be defined as being shorter than the interval between two consecutive PDCCH transmissions (as being transmitted once every 1 ms). To achieve latency reduction the networks node 200 can thus be configured to schedule DL data on short timeframes, such as at sTTI level.

The term short PDSCH (sPDSCH) denote the short physical downlink shared channel when using a short subframe and the term short PUSCH (sPUSCH) denote short physical uplink shared channel when using a short subframe. Similarly, short PDCCH (sPDCCH) is used to denote the short physical downlink control channel when using a short subframe, sDCI is used to denote short DCI (Downlink Control Information) when using a short subframe, and sCCE is used to denote a short CCE (Control Channel Element) when using a short subframe.

Reference is now made to FIG. 6 illustrating methods for transmitting a DL grant and DL data to a wireless device 300a as performed by the network node 200 according to further embodiments. It is assumed that steps S102 and S106 are performed as disclosed above.

The network node 200 can be configured to, in a step S104, transmit a message that defines the sTTI frequency band to the wireless device 300a. In this respect the transmit module 210b may comprise instructions that when executed by the network node 200 causes the processing circuitry 210, possibly in conjunction with the communications interface 220 and the storage medium 230, to transmit the message to the wireless device 300a in order for the network node 200 to perform step S104. Step S104 can be performed after step S102 but before step S106.

For example, one or more sPDSCH regions can be defined in the sTTI frequency bands. These one or more sTTI frequency bands can be common for some or all wireless devices 300a, 300b using short TTIs. Multiple more sTTI frequency bands can be used to cater for different subgroups of wireless devices 300a, 300b using short TTIs. Multiple more sPDSCH regions can be used to cater for different subgroups of wireless devices 300a, 300b using the sTTI. Each sTTI frequency band can occupy a number of resource blocks for the entire subframe, with the exception of the allocated PDCCH region. The sTTI frequency band can be defined by the PDCCH once per 1 ms, such as in a slow grant. The placement of the one or more sPDSCH regions in the sTTI frequency band can be done for each sTTI, thus more often than once per 1 ms. The message transmitted in step S104 can therefore be transmitted as a grant on a PDCCH and provide an identification of the sTTI frequency band. Further, the DL grant transmitted in step S106 can be provided in a sPDCCH region of the sTTI frequency band. Thus, the PDCCH can define the sTTI frequency band once per 1 ms; and the sPDCCH can define the sPDSCH (which is a subset of the sTTI frequency band) more often than once per 1 ms. A symbol length search space for the DL grant can thereby be defined for sTTI scheduling of DL data by mapping the sPDSCH region to the location of the DL grant.

The DL grant can be provided in an sDCI message. In this respect, since the sTTI UL and DL scheduling can be transmitted many times per subframe to a wireless device 300a, it can be necessary to limit the amount of information contained in the sDCI messages. By letting the position of the DL grant within the sTTI frequency band code the location of the DL data of the wireless device (for example the sPDSCH region), explicit information relating to frequency allocation of the DL data can be removed. The mapping can be achieved by enabling the wireless device 300a to identify one of a predefined set of configurations. The sDCI information could thus be positioned in a predefined sCCE pattern within the first OFDM symbol of the downlink sTTI. The rest of the downlink sTTI OFDM symbols (excluding PDSCH reference symbols) within the sTTI can then be used for sPDSCH. Hence, according to an embodiment the DL data is provided in a Physical Downlink Shared Channel (sPDSCH) region of the sTTI frequency band.

Figure 9:
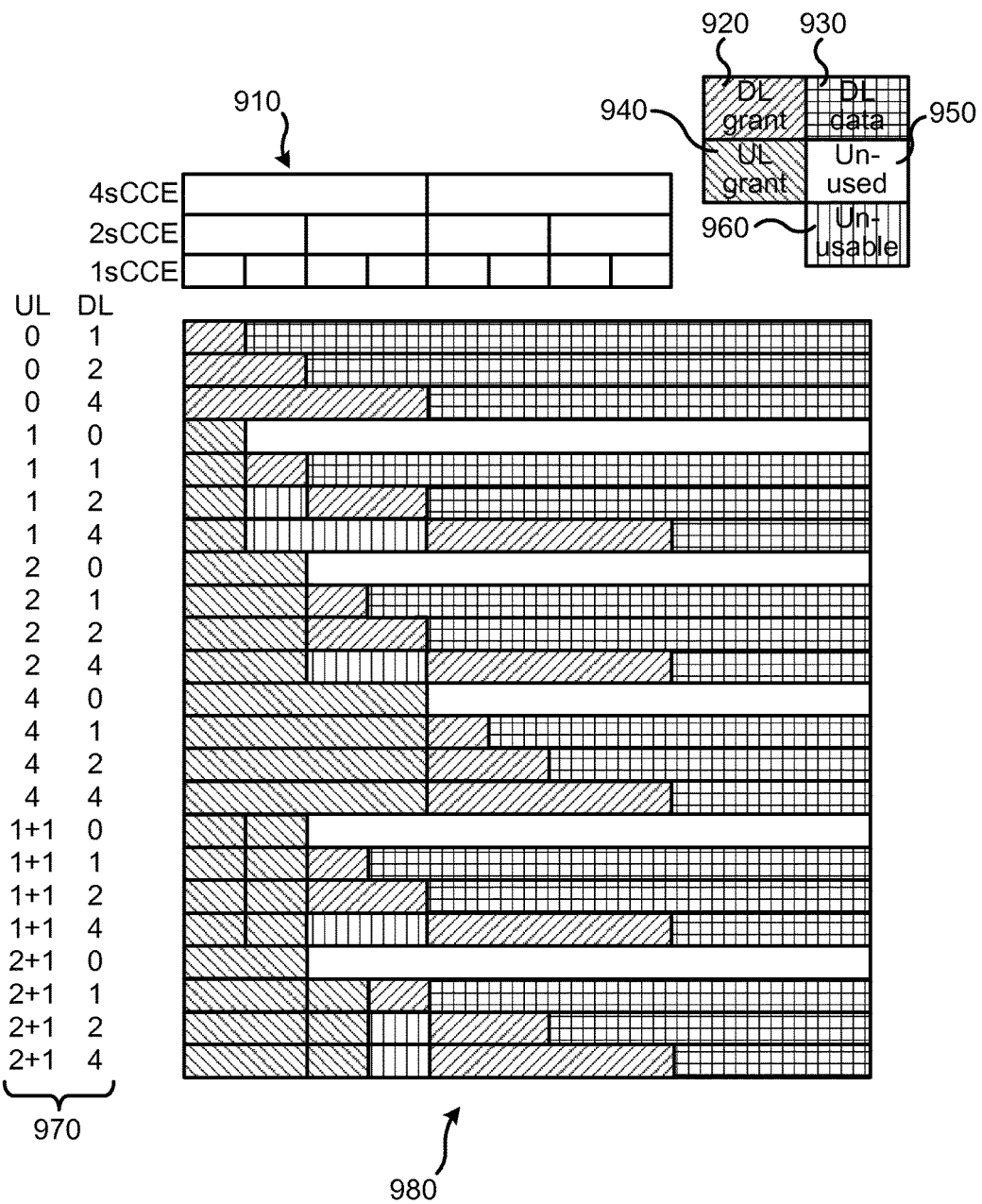
FIGS. 9, 11, 12, 13, and 14 are schematic illustrations of allocations of DL grant and DL data according to embodiments.
Figure 9:
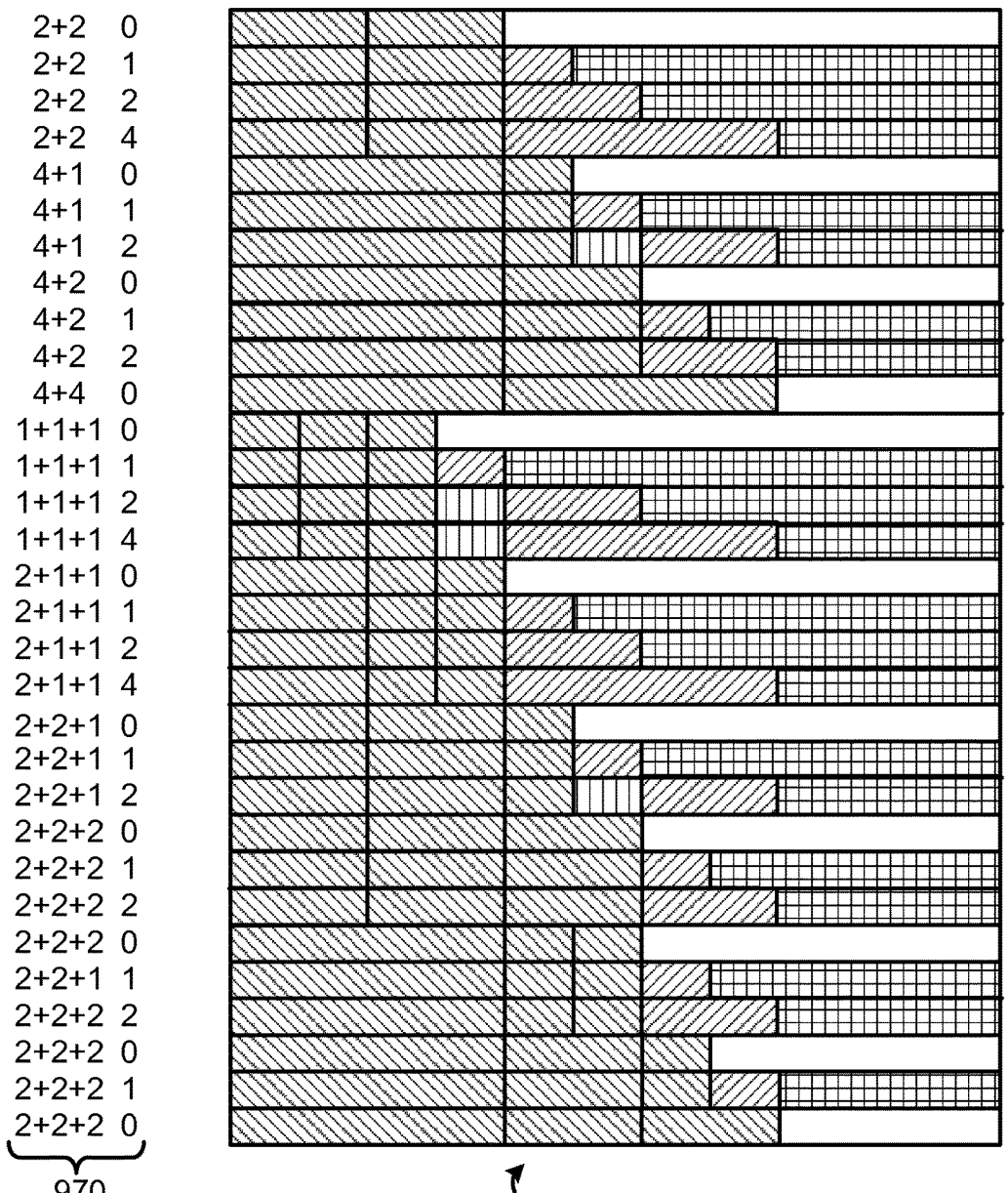

FIG. 9 is a schematic illustration of allocations of DL grant 920 and DL data 930 in the sTTI frequency band 980 for different combinations 970 of UL grants 940 and DL grants 920 according to an embodiment. Unused resources 950 and unusable resources 960 (due to the configuration of the aggregation levels of sCCEs used) are also illustrated. FIG. 9 further schematically illustrates at 910 the configuration of the aggregation levels of sCCEs used. Consider the illustrative example, as illustrated in FIG. 9, where a maximum of one DL grant, in addition to zero, one or more UL grants, can be sent per sTTI, implying that the sTTI band in the downlink is only used by one wireless device 300a at a time. This allows for the use of short sDCI messages both for UL and DL grants.

For example, the DL grant may only occupy resources in the sTTI frequency band in terms of one aggregation level of Control Channel Elements (sCCEs) in the sTTI frequency band. According to an embodiment the aggregation level corresponds to an aggregation of 1, 2, or 4 sCCEs in the sTTI frequency band. The position of the DL grant in the sTTI frequency band can then be defined by the aggregation level of the sCCEs in the sTTI frequency band. In the top of FIG. 9, configurations (also denoted search spaces) for the different aggregation levels 1, 2, or 4 sCCE are shown for a total region of 8 used sCCEs.

The DL grant and the DL data can be mapped in sequential order in the sTTI frequency band, for example starting with the UL grant followed by the DL grant. The order can be in increasing sub-carrier index, decreasing sub-carrier index or any other order where a mapping from a logical to physical index is used. The mapping can be done from consecutive indices to a distributed placement in order to improve frequency diversity of the sDCI messages. The DL data (for example provided in a sPDSCH region of the sTTI frequency band) can thereby be allocated to all remaining sequential sub-carriers after mapping of UL and DL grants, in the same OFDM symbol as the DL grant. According to an embodiment one single DL grant is transmitted in the sTTI frequency band.

The sTTI frequency band can comprise both a DL grant and an UL grant. According to an embodiment the network node 200 is therefore configured to, in a step S106a, transmit, in the sTTI frequency band, at least one uplink (UL) grant for the wireless device 300a. In this respect the transmit module 210b may comprise instructions that when executed by the network node 200 causes the processing circuitry 210, possibly in conjunction with the communications interface 220 and the storage medium 230, to transmit the at least one UL grant for the wireless device 300a in the sTTI frequency band in order for the network node 200 to perform step S106a. Step S106a can be performed as part of step S106.

The UL grant and the DL grant can be mapped in sequential order in the sTTI frequency band. The sTTI frequency band can be associated with a set of sequential indices to sub-carriers. The sequential order can then be defined according to a pre-defined mapping from sequential index in the set of sequential indices to sub-carrier index in the sTTI frequency band. The UL grant, the DL grant and the DL data can be provided in one OFDM symbol in the sTTI frequency band, and the UL grant, the DL grant and the DL data can allocate all resources of this one OFDM symbol. Since flexible sTTI length (such as down to one OFDM symbol) also could be supported, the transmission from the network node 200 may need to fit within one OFDM symbol.

In terms of sCCEs, the sCCEs can hence comprise both DL sDCI and UL sDCI. By allowing for multiple sCCEs being used to code one sDCI a wireless device specific fast link adaptation can be obtained, thereby extending coverage of the sTTI service. The sCCE may, similarly as the CCE in the Long term Evolution (LTE) communications system, be constructed of 36 resource elements, each Quadrature Phase Shift Keying (QPSK) modulated, or may have another allocation.

In the illustrative example of FIG. 9 each row corresponds to one OFDM symbol, which is the first symbol of an sTTI comprising 1-14 OFDM symbols. In this illustrative example a maximum of one DL grant and one or more UL grants could be assigned. The location of the DL grant codes the location of the DL data (the sPDSCH) region. FIG. 9 shows the use of up to three UL grants, but with the configurations of sCCEs exemplified, up to 8 single-sCCE grants may be given.

Figure 10:
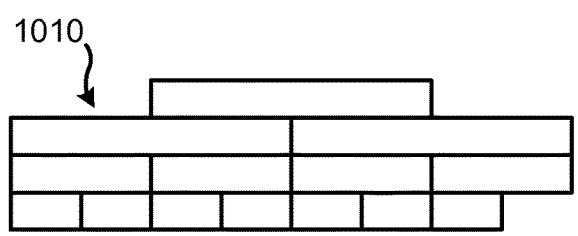
FIG. 10 is a schematic illustration of Control Channel Element aggregation levels according to an embodiment.

To limit the number of blind decodings, i.e., decodings where resources of the sTTI frequency band are unusable due to the defined aggregation levels of sCCEs, some of the possible search spaces for the DL data may be reduced. This can be achieved by modifying allocations of the sCCEs of different aggregation level in the sTTI frequency band. For example, the last 1 sCCE configuration can only be used for certain scenarios where there are three UL grants and may hence be excluded. For example, in order to limit the amount of unusable resources, a new configuration of the aggregation level of 4 sCCE located at the middle four CCEs of one aggregation level of 8 sCCEs may be defined to avoid some of the regions denoted "unusable" in FIG. 9. Hence, according to an embodiment the DL grant only occupies resources in the sTTI frequency band in terms of one aggregation level of sCCEs in the sTTI frequency band, where the aggregation level corresponds to an aggregation of 1, 2, or 4 sCCEs in the sTTI frequency band, and where at least one of the aggregation of the 1, 2, or 4 sCCEs have overlapping staring positions in the sTTI frequency band. In this way the amount of unusable resource in the sTTI frequency region can be reduced, or even minimized. An example of the revised configurations of sCCEs, as defined by aggregation levels of the sCCEs, is given in FIG. 10. FIG. 10 schematically illustrates at 1010 an embodiment of a modified configuration of the aggregation levels of sCCEs. See also the embodiment relating to FIG. 12 below.

According to an embodiment the DL grant and the DL data are transmitted in a first OFDM symbol, and further DL data to the wireless device 300a is transmitted in a second OFDM symbol. The second OFDM symbol is adjacent to the first OFDM symbol. The position of the DL grant in the sTTI frequency band identifies a position of the further DL data in the sTTI frequency band. In terms of sCCEs, the DL grant and the further DL data thereby start at a common sCCE in the sTTI frequency band, and the position of the further DL data is defined by this common sCCE.

Figure 11:
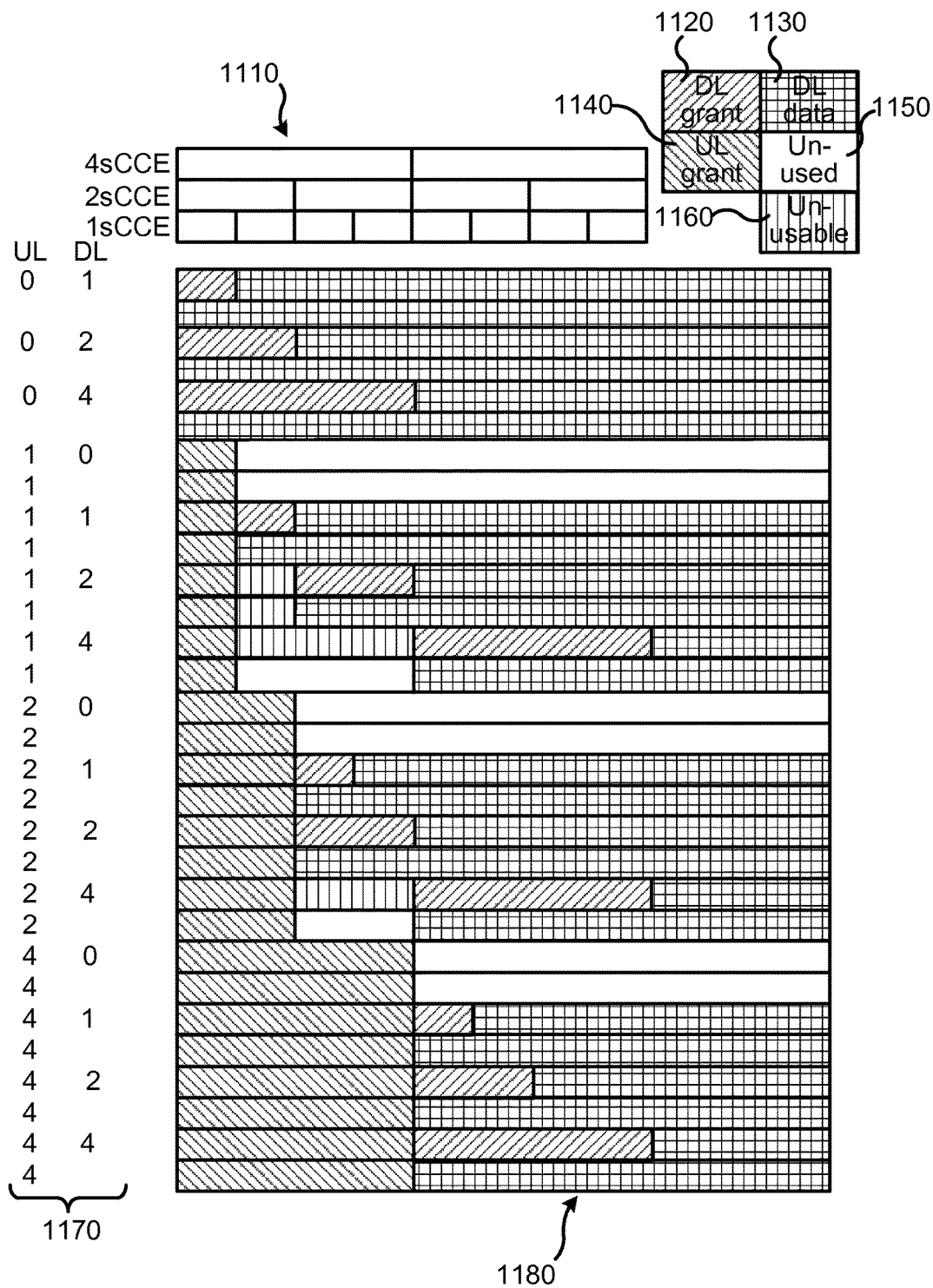

An illustration is given in FIG. 11 for DL grants and UL grants with an sTTI occupying two OFDM symbols in the downlink. FIG. 11 is a schematic illustration of allocations of DL grant 1120 and DL data 1130 in the sTTI frequency band 1180 for different combinations 1170 of UL grants 1140 and DL grants 1120, each occupying two OFDM symbols according to an embodiment. Unused resources 1150 and unusable resources 1160 (due to the configuration of the aggregation levels of sCCEs used) are also illustrated. FIG. 11 further schematically illustrates at 1110 the configuration of the aggregation levels of sCCEs used. The UL grant and the DL grant are mapped in sequential order, starting with the UL grant followed by the DL grant. The order can be in increasing sub-carrier index, decreasing sub-carrier index or any other order where a mapping from a logical to physical index is used.

The DL data is allocated to all remaining sequential sub-carriers after mapping of the UL grant and the DL grant in the same OFDM symbol as the DL grant. In the following OFDM symbol after the DL grant, the DL data is mapped to a larger set of sub-carriers as compared to the first OFDM symbol. These sub-carriers in the second OFDM symbol include both the sub-carriers used for DL data in the first OFDM symbol and the sub-carriers used for the DL grant in the first OFDM symbol.

The same approach can be used in the case of three or more OFDM symbols included in the sTTI. Then all the OFDM symbols except the first symbol of the TTI use the same sub-carriers for sPDSCH (and hence for the DL data). Further, it is possible to include an UL grant in any of the OFDM symbols included in the downlink sTTI if the first OFDM symbol of the downlink sTTI has not placed the DL grant in the first sCCE. Depending on the placement of the DL grant, a maximum number of sCCEs for possible UL grants in the coming OFDM symbols is created.

Figure 12:
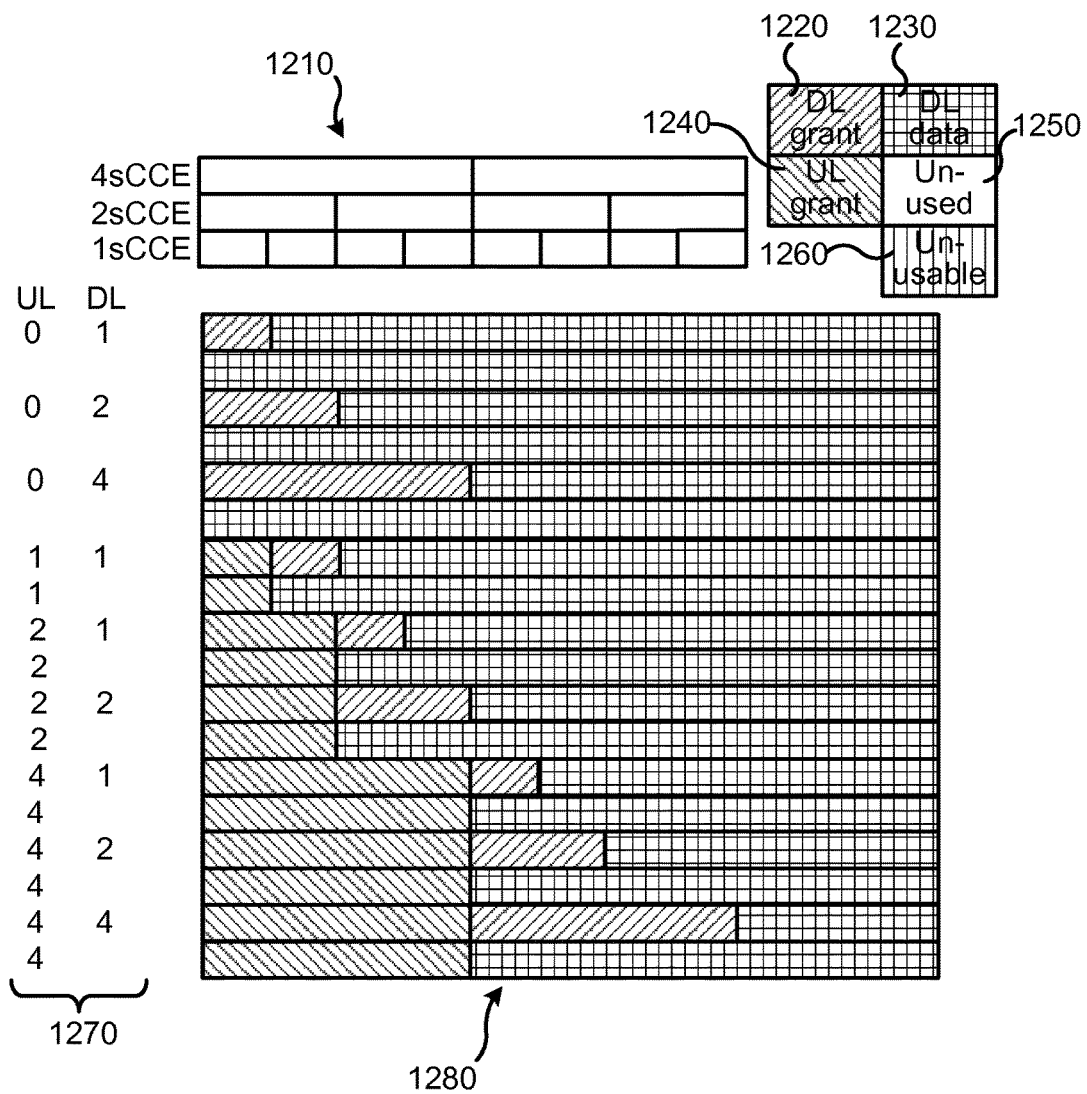

According to an embodiment neither the first OFDM symbol nor the second OFDM symbol in the sTTI comprise any other resources than the DL grant, the DL data, and at most one uplink, UL, grant. This is illustrated in the example of FIG. 12. FIG. 12 is a schematic illustration of allocations of DL grant 1220 and DL data 1230 in the sTTI frequency band 1280 for different combinations 1270 of UL grants 1240 and DL grants 1220 for two OFDM symbols according to an embodiment. Unused resources 1250 and unusable resources 1260 (due to the configuration of the aggregation levels of sCCEs used) are also illustrated. FIG. 12 further schematically illustrates at 1210 the configuration of the aggregation levels of sCCEs used. Hence, FIG. 12 can be regarded as an extension of FIG. 11 but without having any unusable resources. In FIG. 12 the UL grants are using all resources up to the resources as used for the DL grant. Here, the UL grants in FIG. 12 are more robust (because of the use of more resources) without the overhead being increased; the UL grants are using resources which otherwise would be unused or unusable). This embodiment also has the benefit that the size of the search space for the DL data is significantly reduced.

Figure 13:
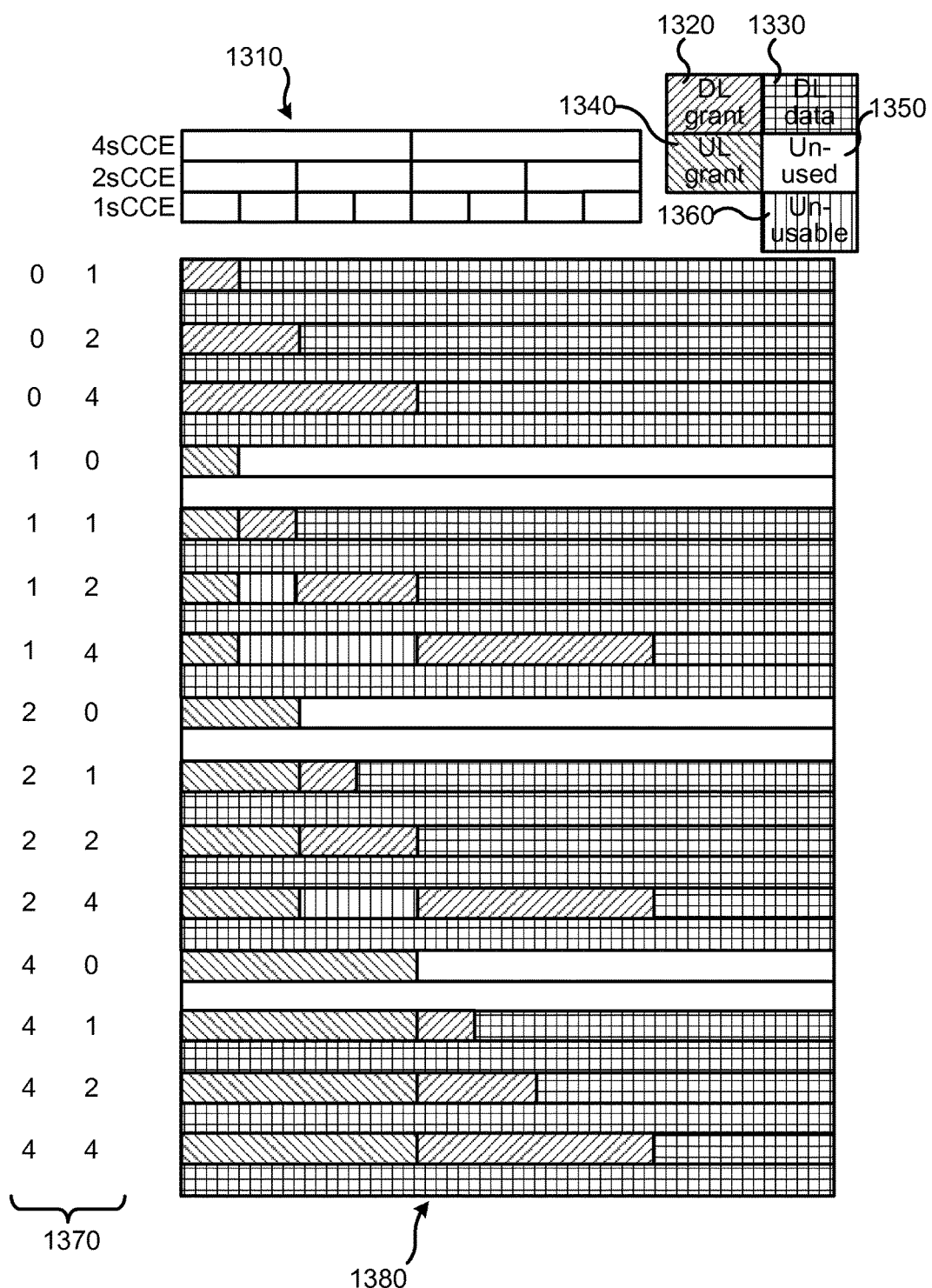

A further extension of FIG. 11 is to allow UL grants only in the first OFDM symbol within the sTTI. Hence, according to an embodiment the DL grant and the DL data are transmitted in a first OFDM symbol, and further DL data to the wireless device 300a is transmitted in a second OFDM symbol adjacent to the first OFDM symbol, and where the second OFDM symbol in the sTTI does not comprise any other resources than the DL data. The first OFDM symbol may further comprises at most one UL grant. An illustrative example is given in FIG. 13. FIG. 13 is a schematic illustration of allocations of DL grant 1320 and DL data 1330 in the sTTI frequency band 1380 for different combinations 1370 of UL grants 1340 and DL grants 1320 for two OFDM symbols according to an embodiment. Unused resources 1350 and unusable resources 1360 (due to the configuration of the aggregation levels of sCCEs used) are also illustrated. FIG. 13 further schematically illustrates at 1310 the configuration of the aggregation levels of sCCEs used. The UL grant and the DL grant are mapped in sequential order, starting with the UL grant followed by the DL grant. The order can be in increasing sub-carrier index, decreasing sub-carrier index or any other order where a mapping from a logical to physical index is used.

In this embodiment the DL data is allocated to all remaining sequential sub-carriers after mapping of the UL grant and the DL grant in the same OFDM symbol as the DL grant. In the following OFDM symbol after the DL grant, the DL data is mapped to all sub-carriers as included in the slow grant. The same approach can be used in the case of three or more OFDM symbols are included in the sTTI. Then all OFDM symbols, except the first OFDM symbol of the sTTI can use the same sub-carriers for the DL data. Further, in this embodiment it is only possible to include an UL grant in the first OFDM symbol included in the sTTI.

According to an embodiment the network node 200 is configured to, in a step S102a, obtain an indication for providing further DL data to a further wireless device 300b. In this respect the obtain module 210a may comprise instructions that when executed by the network node 200 causes the processing circuitry 210, possibly in conjunction with the communications interface 220 and the storage medium 230, to obtain the indication in order for the network node 200 to perform step S102a. Step S102a can be performed as part of step S102. The network node 200 can then be configured to, in a step S106b, transmit, in the sTTI frequency band, a further DL grant for the further wireless device 300b and the further DL data for the further wireless device 300b. In this respect the transmit module 210b may comprise instructions that when executed by the network node 200 causes the processing circuitry 210, possibly in conjunction with the communications interface 220 and the storage medium 230, to transmit the further DL grant for the further wireless device 300b and the further DL data for the further wireless device 300b in the sTTI frequency band in order for the network node 200 to perform step S106b. Step S106b can be performed as part of step S106. A position of the DL grant in the sTTI frequency band identifies a region of the DL data for the wireless device 300a in the sTTI frequency band. A position of the further DL grant in the sTTI frequency band identifies a region of the further DL data for the further wireless device 300b in the sTTI frequency band.

Figure 14:
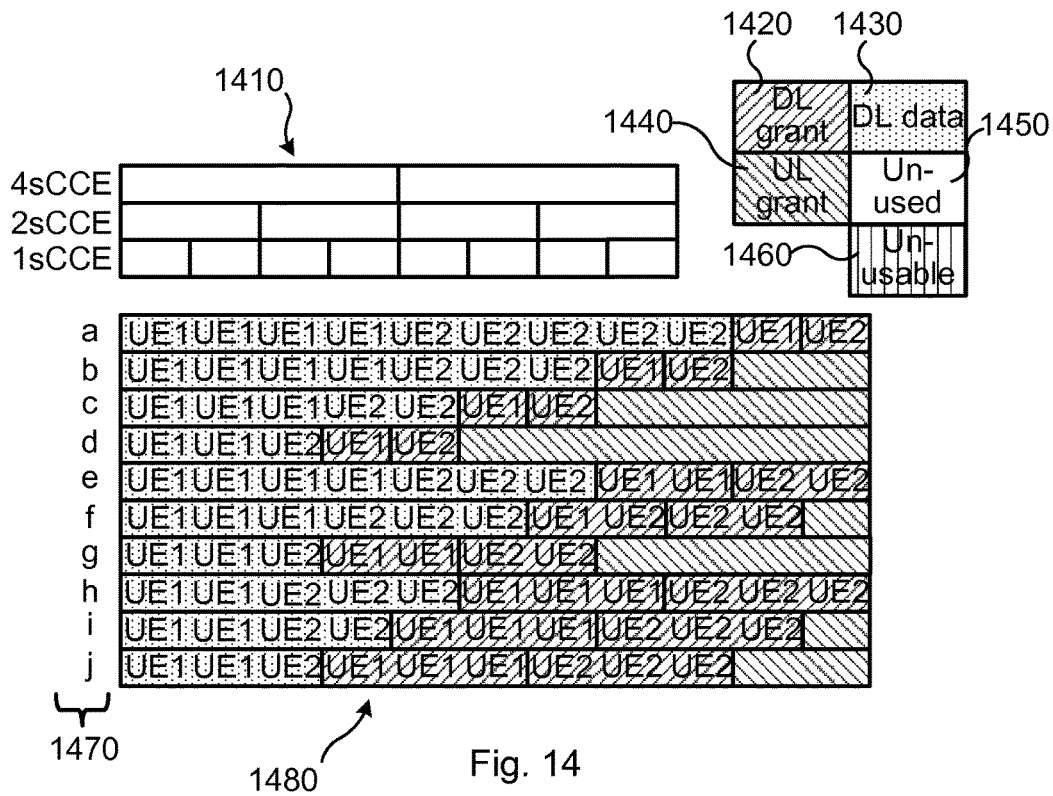

An example of this embodiment is illustrated in FIG. 14. In FIG. 14 each row corresponds to resources in one OFDM symbol which is the first OFDM symbol of an sTTI comprising 1-14 OFDM symbols. FIG. 14 is a schematic illustration of allocations of DL grant 1420 and DL data 1430 in the sTTI frequency band 1480 for different combinations 1470 of UL grants 1440 and DL grants 1420 for two wireless devices, denoted "UE1" and "UE2", according to an embodiment. Unused resources 1450 and unusable resources 1460 (due to the configuration of the aggregation levels of sCCEs used) are also illustrated. FIG. 14 further schematically illustrates at 1410 the configuration of the aggregation levels of sCCEs used. Here, two DL grants can be supported per sTTI frequency band, and the sPDSCH region is shared between two DL data transmissions with predefined location. The UL grant region can comprise multiple allocations. Multiple DL grants and UL grants can thus be transmitted in every sTTI frequency band, and the sPDSCH region can comprise DL data to multiple wireless devices. In the illustrative example of FIG. 14 the sCCE positions of a DL DCI correspond to a specific DL data region for the wireless device 300a. In the illustrative example of FIG. 14 the CCE positions coding for multiple downlink allocations start from the upper end of the logical indices of the sTTI frequency band to separate it from the case of only one downlink allocation (i.e., downlink allocation to a single wireless device 300a). The UL grant region can comprise UL grants to multiple wireless devices 300a, 300b. To support multiple DL data allocations, the location of DL data to a specific wireless device 300a can be predefined for a given sTTI frequency band.

Figure 15:
FIG. 15 is a schematic illustration of forbidden allocations of DL grant and DL data according to an embodiment.

In order for the wireless device 300a to uniquely determine the allocation of its DL data, only a certain set of unique positions of the DL grant and the DL data can be used. These combinations cannot be reused in other combinations. Hence, according to an embodiment the DL grant and the further DL grant are positioned in the sTTI frequency band according to a predetermined pattern comprising only a true subset of all possible positions of the DL grant and the further DL grant in the sTTI frequency band. An illustrative example is given in the sTTI frequency band 1510 of FIG. 15, where the DL grant for "UE2" is placed on the same position as the DL grant for "UE1" on row "e" in FIG. 14. Thus, the structure in FIG. 15 cannot be used.

An indication of which one of the embodiments in FIGS. 9-14 that is used for transmitting the DL grant and the DL data as in step S106 and S106b can be achieved by the network node 200 including an indicator thereof in the DL grant.

Further, an indication of the length of the sTTI (in number of symbols) can be signaled in the DL grant. Further, the length of the sTTI can be given as DCI once per subframe, be radio resource control (RRC) configured, or be predefined.

Reference is now made to FIG. 7 illustrating a method for receiving a DL grant and DL data to from a network node 200 as performed by the wireless device 300a according to an embodiment.

The wireless device 300a is configured to, in a step S202, obtain an indication for receiving the DL data from the network node 200. In this respect the obtain module 310a may comprise instructions that when executed by the wireless device 300a causes the processing circuitry 310, possibly in conjunction with the communications interface 320 and the storage medium 330, to obtain the indication in order for the wireless device 300a to perform step S202.

As disclosed above, the network node 200 in step S106 transmits a DL grant and DL data to the wireless device 200. It is assumed that the wireless device 300a receives this DL grant and DL data. Hence, the wireless device 300a is configured to, in a step S206, receive, in an sTTI frequency band and from the network node 200, the DL grant for the wireless device 300a and the DL data for the wireless device 300a. In this respect the receive module 310b may comprise instructions that when executed by the wireless device 300a causes the processing circuitry 310, possibly in conjunction with the communications interface 320 and the storage medium 330, to receive the DL grant for the wireless device 300a and the DL data for the wireless device 300a from the network node 200 in the sTTI frequency band in order for the wireless device 300a to perform step S206.

As disclosed above, the position of the DL grant in the sTTI frequency band identifies a position of the DL data in the sTTI frequency band.

Embodiments relating to further details of receiving a DL grant and DL data to from a network node 200 as performed by the wireless device 300a will now be disclosed.

Reference is now made to FIG. 8 illustrating methods for receiving a DL grant and DL data to from a network node 200 as performed by the wireless device 300a according to further embodiments. It is assumed that steps S202 and S206 are performed as disclosed above.

As disclosed above, the network node 200 can, in a step S104, transmit a message to the wireless device 300a, where the message defines the sTTI frequency band. Hence, according to an embodiment the wireless device 300a is configured to, in a step S204, receive a message from the network node 200 where the message defines the sTTI frequency band. In this respect the receive module 310b may comprise instructions that when executed by the wireless device 300a causes the processing circuitry 310, possibly in conjunction with the communications interface 320 and the storage medium 330, to receive the message from the network node 200 in order for the wireless device 300a to perform step S204. Step S204 can be performed after step S202 but before step S206.

As disclosed above, the network node 200 can, in a step S106a, transmit at least one UL grant for the wireless device 300a in the sTTI frequency band. Hence according to an embodiment the wireless device 300a is configured to, in a step S206a, receive, in the sTTI frequency band, at least one UL grant for the wireless device 300a. In this respect the receive module 310b may comprise instructions that when executed by the wireless device 300a causes the processing circuitry 310, possibly in conjunction with the communications interface 320 and the storage medium 330, to receive the at least one UL grant from the network node 200 in the sTTI frequency band in order for the wireless device 300a to perform step S206a. Step S206a can be performed as part of step S206.

In terms of receiving the DL data, the wireless device 300a may monitor the resources in the sTTI frequency bands, and attempt to decode packets which have a Cyclic Redundancy Check (CRC) scrambled with their Radio Network Temporary Identifier (RNTI). Such a packet can be either a UL grant or a DL grant. The DL grant can indicate the length of the downlink TTIs.

According to an embodiment only one UL grant is received in step S206a. This UL grant can occupy resources corresponding to a number N (where N is a positive integer) of sCCEs in the sTTI frequency band. The DL grant can then occupy resources corresponding to at most N sCCEs in the sTTI frequency band.

According to this embodiment the wireless device 300a can therefore be configured to, in a step S206b, search for the DL grant in the sTTI frequency band according to the number N of sCCEs in the sTTI frequency band for the UL grant. In this respect the search module 310c may comprise instructions that when executed by the wireless device 300a causes the processing circuitry 310, possibly in conjunction with the communications interface 320 and the storage medium 330, to search for the DL grant in the sTTI frequency band according to the number N of sCCEs in the sTTI frequency band for the UL grant in order for the wireless device 300a to perform step S206b. Step S206b can be performed as part of step S206.

As disclosed above, the network node 200 may, in step S106b transmit a further DL grant for a further wireless device 300b and the further DL data for the further wireless device 300b in the sTTI frequency band. If this is the case, then step S206b may have to be modified to not be based on the received number of sCCEs for the UL grants since if the UL grant is for the further wireless device 300b then it cannot be decoded. For example, the search in step S206b may be modified based on the above disclosed aggregation levels of the sCCEs such that the search for the DL grant starts only at sCCEs according to the used aggregation level of sCCEs.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmitting a downlink (DL) grant and DL data to a wireless device, the method comprising a network node:
   obtaining an indication for providing the DL data to the wireless device; and
   transmitting, in a transmission time interval (sTTI) frequency band, the DL grant for the wireless device and the DL data for the wireless device;
   wherein a position of the DL grant in the sTTI frequency band identifies a position of the DL data in time-frequency resources within the sTTI frequency band.

2. The method of claim 1, further comprising transmitting a message to the wireless device, the message defining the sTTI frequency band.

3. The method of claim 1, wherein the DL data is provided in a Physical Downlink Shared Channel (sPDSCH) region of the sTTI frequency band.

4. The method of claim 2, wherein the message is transmitted as a grant on a Physical Downlink Control Channel (PDCCH) and provides an identification of the sTTI frequency band.

5. The method of claim 1, wherein the DL grant is provided in a Physical Downlink Control Channel (sPDCCH) region of the sTTI frequency band.

6. The method of claim 1, wherein the DL grant is provided in a Downlink Control Information (sDCI) message.

7. The method of claim 1, wherein the DL grant and the DL data are mapped in sequential order in the sTTI frequency band.

8. The method of claim 1, wherein one single DL grant is transmitted in the sTTI frequency band.

9. The method of claim 1:
   wherein the DL grant only occupies resources in the sTTI frequency band in terms of one aggregation level of Control Channel Elements (sCCEs) in the sTTI frequency band;
   wherein the aggregation level corresponds to an aggregation of 1, 2, or 4 sCCEs in the sTTI frequency band.

10. The method of claim 9, wherein the position of the DL grant in the sTTI frequency band is defined by the aggregation level of the sCCEs in the sTTI frequency band.

11. The method of claim 1, further comprising transmitting at least one uplink (UL) grant for the wireless device in the sTTI frequency band.

12. The method of claim 11, wherein the UL grant and the DL grant are mapped in sequential order in the sTTI frequency band.

13. The method of claim 12:
   wherein the sTTI frequency band is associated with a set of sequential indices to sub-carriers; and
   wherein the sequential order is defined according to a pre-defined mapping from sequential index in the set of sequential indices to sub-carrier index in the sTTI frequency band.

14. The method of claim 11:
   wherein the UL grant, the DL grant, and the DL data are provided in one Orthogonal Frequency Division Multiplexing (OFDM) symbol in the sTTI frequency band; and
   wherein the UL grant, the DL grant, and the DL data allocate all resources of the one OFDM symbol.

15. The method of claim 1:
   wherein the DL grant only occupies resources in the sTTI frequency band in terms of one aggregation level of Control Channel Elements (sCCEs) in the sTTI frequency band;
   wherein the aggregation level corresponds to an aggregation of 1, 2, or 4 sCCEs in the sTTI frequency band; and
   wherein at least one of the aggregation of the 1, 2, or 4 sCCEs have overlapping staring positions in the sTTI frequency band.

16. The method of claim 1:
   wherein the DL grant and the DL data are transmitted in a first Orthogonal Frequency Division Multiplexing (OFDM) symbol;
   wherein further DL data to the wireless device is transmitted in a second OFDM symbol adjacent to the first OFDM symbol; and
   wherein the position of the DL grant in the sTTI frequency band identifies a position of the further DL data in the sTTI frequency band.

17. The method of claim 16:
   wherein the DL grant and the further DL data start at a common Control Channel Element (sCCE) in the sTTI frequency band; and
   wherein the position of the further DL data is defined by the common sCCE.

18. The method of claim 16, wherein neither the first OFDM symbol nor the second OFDM symbol in the sTTI comprise any other resources than the DL grant, the DL data, and at most one uplink (UL) grant.

19. The method of claim 1:
   wherein the DL grant and the DL data are transmitted in a first Orthogonal Frequency Division Multiplexing (OFDM) symbol;
   wherein further DL data to the wireless device is transmitted in a second OFDM symbol adjacent to the first OFDM symbol; and
   wherein the second OFDM symbol in the sTTI does not comprise any other resources than the DL data.

20. The method of claim 16, wherein the first OFDM symbol further comprises at most one uplink (UL) grant.

21. The method of claim 1, further comprising:
   obtaining an indication for providing further DL data to a further wireless device;
   transmitting, in the sTTI frequency band, a further DL grant for the further wireless device and the further DL data for the further wireless device;
   wherein a position of the DL grant in the sTTI frequency band identifies a region of the DL data for the wireless device in the sTTI frequency band; and
   wherein a position of the further DL grant in the sTTI frequency band identifies a region of the further DL data for the further wireless device in the sTTI frequency band.

22. The of claim 1, wherein the DL grant and the further DL grant are positioned in the sTTI frequency band according to a predetermined pattern comprising only a true subset of all possible positions of the DL grant and the further DL grant in the sTTI frequency band.

23. The method of claim 1, wherein the DL grant is provided in a Physical Downlink Control Channel (sPDCCH) region and the DL data is provided in a Physical Downlink Shared Channel (sPDSCH) region, with the sPD- CCH region and the sPDSCH region being non-overlapping regions of the same sTTI frequency band.

24. The method of claim 1, wherein the DL grant is transmitted on a control channel and the DL data is transmitted on a data channel, wherein the data channel is shared by multiple wireless devices, and wherein a DL grant transmitted on the control channel indicates to which wireless device the data channel is allocated for transmitting DL data.

25. A method for receiving a downlink (DL) grant and DL data from a network node, the method comprising a wireless device:
obtaining an indication for receiving the DL data from the network node; and
receiving, in a Transmission Time Interval (sTTI) frequency band and from the network node, the DL grant for the wireless device and the DL data for the wireless device;
wherein a position of the DL grant in the sTTI frequency band identifies a position of the DL data in time-frequency resources within the sTTI frequency band.

26. The method of claim 25, further comprising receiving a message to from the network node, the message defining the sTTI frequency band.

27. The method of claim 25, further comprising receiving, in the sTTI frequency band, at least one uplink (UL) grant for the wireless device.

28. The method of claim 27:
wherein only one UL grant is received, wherein the UL grant occupies resources corresponding to a number N of Control Channel Elements (sCCEs) in the sTTI frequency band, where N is a positive integer; and
wherein the DL grant occupies resources corresponding to at most N sCCEs in the sTTI frequency band.

29. The method of claim 28, further comprising searching for the DL grant in the sTTI frequency band according to the number N of sCCEs in the sTTI frequency band for the UL grant.

30. A network node for transmitting a downlink (DL) grant and DL data to a wireless device, the network node comprising:
processing circuitry configured to cause the network node to:
obtain an indication for providing the DL data to the wireless device; and
transmit, in a transmission time interval (sTTI) frequency band, the DL grant for the wireless device and the DL data for the wireless device;
wherein a position of the DL grant in the sTTI frequency band identifies a position of the DL data in time-frequency resources within the sTTI frequency band.

31. A network node for transmitting a downlink (DL) grant and DL data to a wireless device, the network node comprising:
processing circuitry;
memory storing instructions that, when executed by the processing circuitry, causes the network node to:
obtain an indication for providing the DL data to the wireless device; and
transmit, in a transmission time interval (sTTI) frequency band, the DL grant for the wireless device and the DL data for the wireless device;
wherein a position of the DL grant in the sTTI frequency band identifies a position of the DL data in time-frequency resources within the sTTI frequency band.

32. A network node for transmitting a downlink (DL) grant and DL data to a wireless device, the network node comprising:
an obtain circuit configured to obtain an indication for providing the DL data to the wireless device; and
a transmit circuit configured to transmit, in a transmission time interval (sTTI) frequency band, the DL grant for the wireless device and the DL data for the wireless device;
wherein a position of the DL grant in the sTTI frequency band identifies a position of the DL data in time-frequency resources within the sTTI frequency band.

33. A wireless device for receiving a downlink (DL) grant and DL data from a network node, the wireless device comprising:
processing circuitry configured to cause the wireless device to:
obtain an indication for receiving the DL data from the network node; and
receive, in a Transmission Time Interval (sTTI) frequency band and from the network node, the DL grant for the wireless device and the DL data for the wireless device;
wherein a position of the DL grant in the sTTI frequency band identifies a position of the DL data in time-frequency resources within the sTTI frequency band.

34. A wireless device for receiving a downlink (DL) grant and DL data from a network node, the wireless device comprising:
processing circuitry; and
memory storing instructions that, when executed by the processing circuitry, causes the wireless device to:
obtain an indication for receiving the DL data from the network node; and
receive, in a Transmission Time Interval (sTTI) frequency band and from the network node, the DL grant for the wireless device and the DL data for the wireless device;
wherein a position of the DL grant in the sTTI frequency band identifies a position of the DL data in time-frequency resources within the sTTI frequency band.

35. A wireless device for receiving a downlink (DL) grant and DL data from a network node, the wireless device comprising:
an obtain circuit configured to obtain an indication for receiving the DL data from the network node; and
a receive circuit configured to receive, in a Transmission Time Interval (sTTI) frequency band and from the network node, the DL grant for the wireless device and the DL data for the wireless device;
wherein a position of the DL grant in the sTTI frequency band identifies a position of the DL data in time-frequency resources within the sTTI frequency band.

36. A computer program product stored in a non-transitory computer readable medium for controlling transmission of a downlink (DL) grant and DL data to a wireless device, the computer program product comprising software instructions which, when run on processing circuitry of a network node, causes the network entity to:
obtain an indication for providing the DL data to the wireless device; and
transmit, in a transmission time interval (sTTI) frequency band, the DL grant for the wireless device and the DL data for the wireless device;
wherein a position of the DL grant in the sTTI frequency band identifies a position of the DL data in time-frequency resources within the sTTI frequency band.

37. A computer program product stored in a non-transitory computer readable medium for controlling reception of a downlink (DL) grant and DL data from a network node, the computer program product comprising software instructions which, when run on processing circuitry of a wireless device, causes the wireless device to:
- obtain an indication for receiving the DL data from the network node; and
- receive, in a Transmission Time Interval (sTTI) frequency band and from the network node, the DL grant for the wireless device and the DL data for the wireless device;
- wherein a position of the DL grant in the sTTI frequency band identifies a position of the DL data in time-frequency resources within the sTTI frequency band.

* * * * *